S. B. HARVEY.
GAS LAMP.
APPLICATION FILED SEPT. 2, 1909.

1,024,199.

Patented Apr. 23, 1912.
5 SHEETS—SHEET 1.

Witnesses:
P. H. Alford
G. R. Wilkins

Inventor
Samuel B. Harvey
by Parker + Brown
Attys

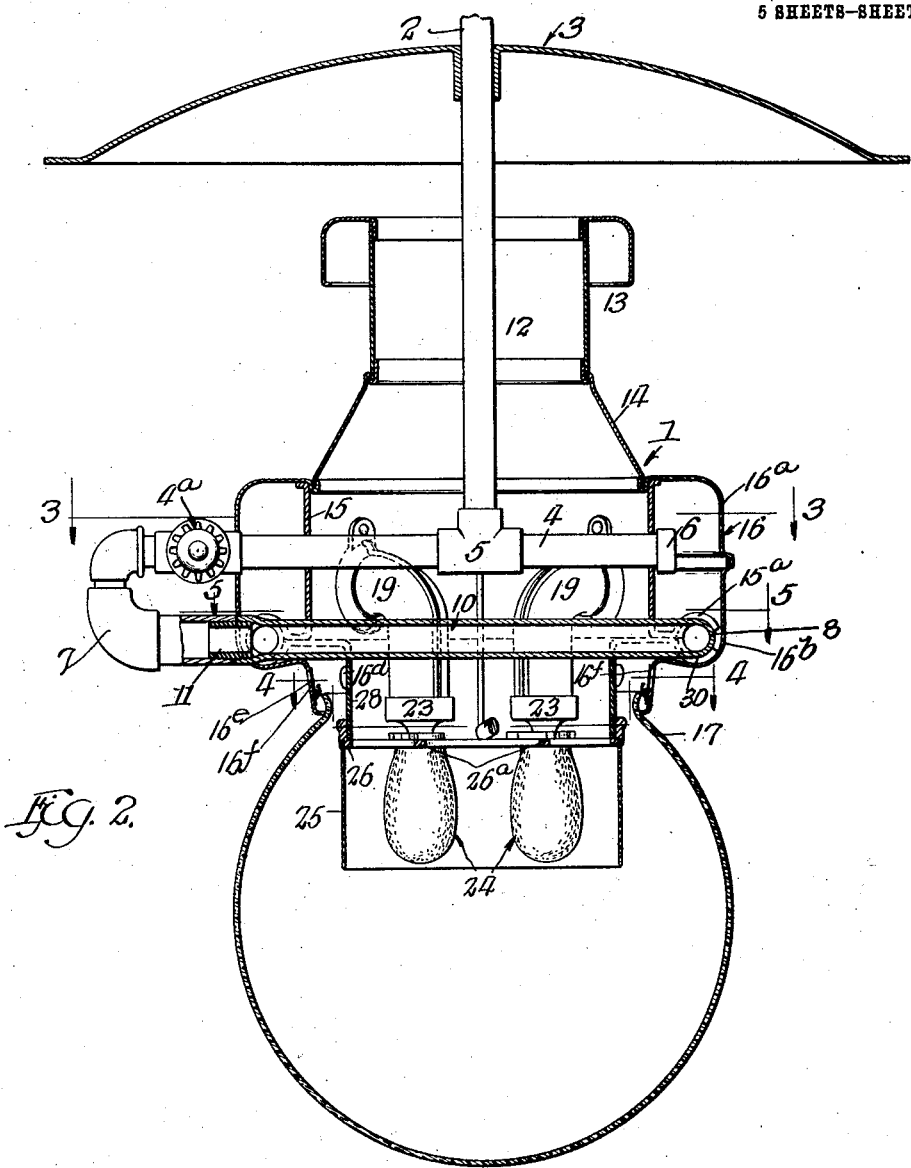
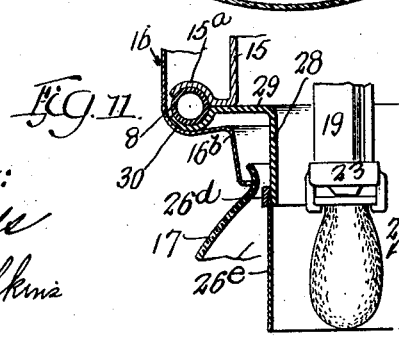

S. B. HARVEY.
GAS LAMP.
APPLICATION FILED SEPT. 2, 1909.

1,024,199.

Patented Apr. 23, 1912.
5 SHEETS—SHEET 3.

Witnesses:

Inventor
Samuel B. Harvey

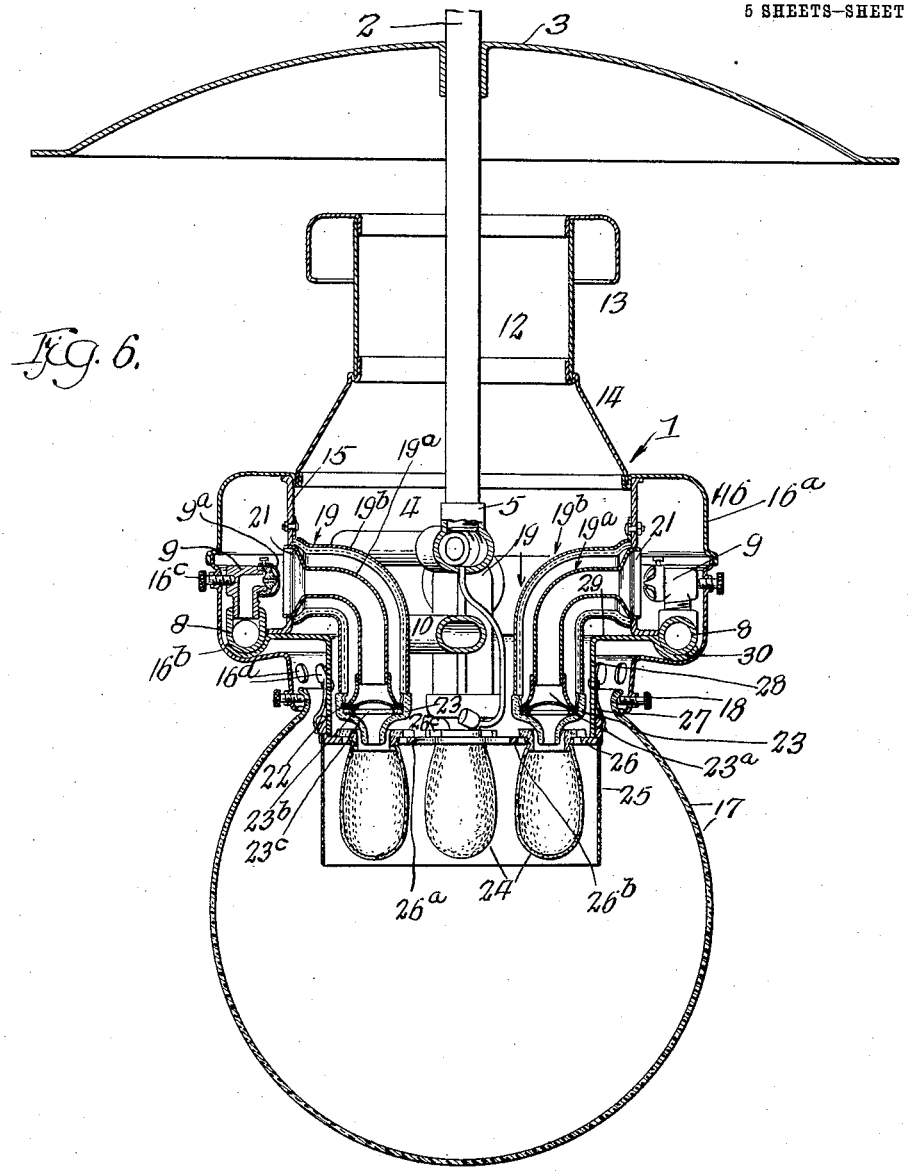

S. B. HARVEY.
GAS LAMP.
APPLICATION FILED SEPT. 2, 1909.
1,024,199.
Patented Apr. 23, 1912.
5 SHEETS—SHEET 5.
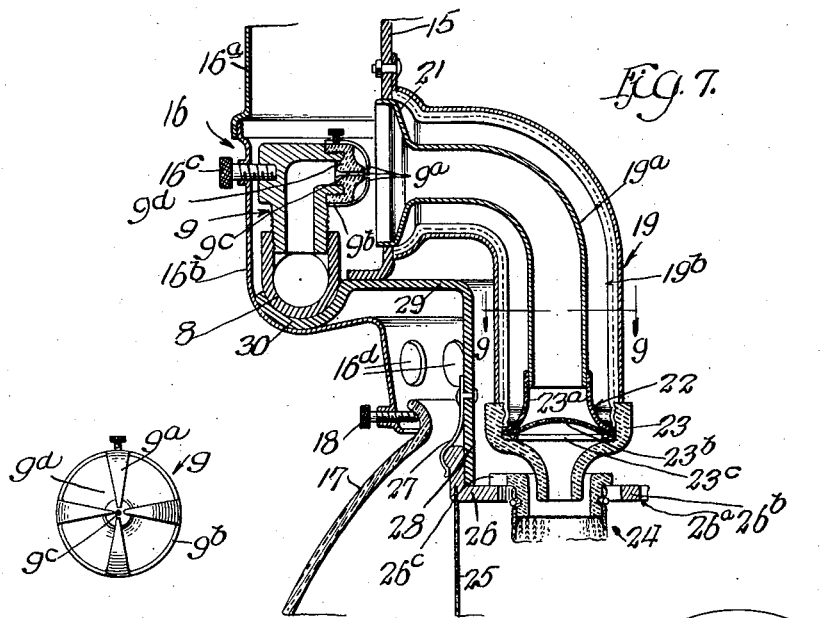
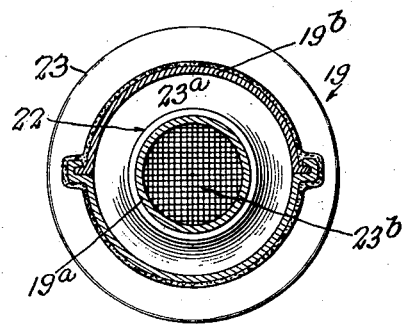
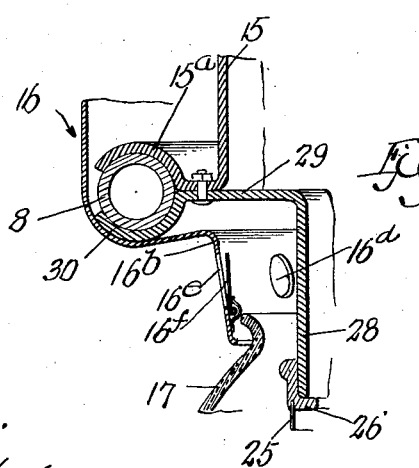
Witnesses:
Inventor
Samuel B. Harvey
by
Attys

UNITED STATES PATENT OFFICE.

SAMUEL B. HARVEY, OF CHICAGO, ILLINOIS.

GAS-LAMP.

1,024,199.  Specification of Letters Patent.  Patented Apr. 23, 1912.

Application filed September 2, 1909. Serial No. 515,925.

*To all whom it may concern:*

Be it known that I, SAMUEL B. HARVEY, a citizen of the United States, and a resident of Chicago, in the county of Cook and State of Illinois, have invented certain new and useful Improvements in Gas-Lamps; and I do hereby declare that the following is a full, clear, and exact description thereof, reference being had to the accompanying drawings, and to the letters of reference marked thereon, which for a part of this specification.

This invention relates to gas lamps and particularly to such lamps as are provided with inverted burners having depending mantles, and consists in the several matters hereinafter fully described and more particularly pointed out in the appended claims.

Figure 1:
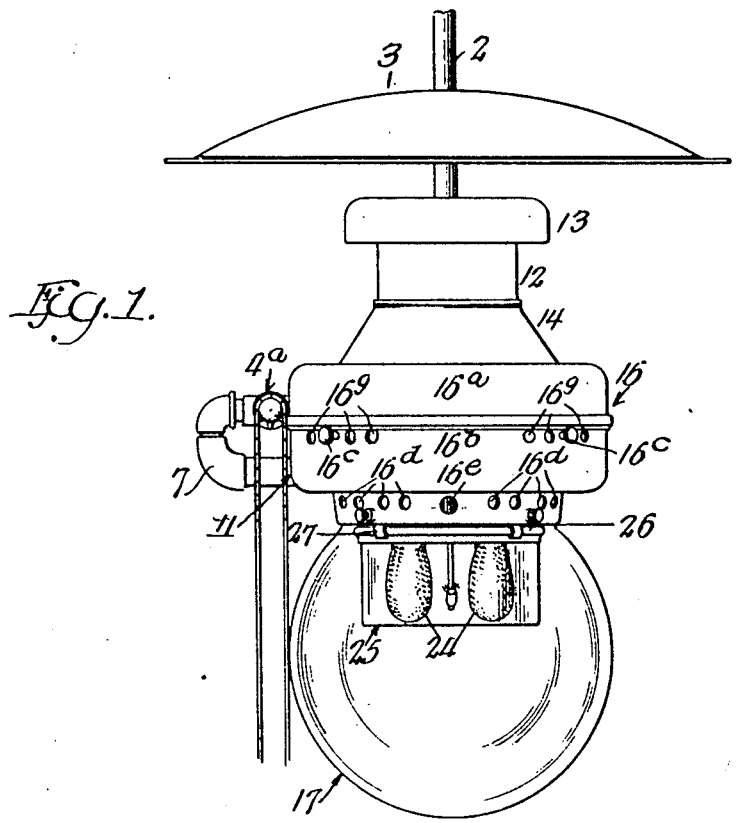
Figure 5:
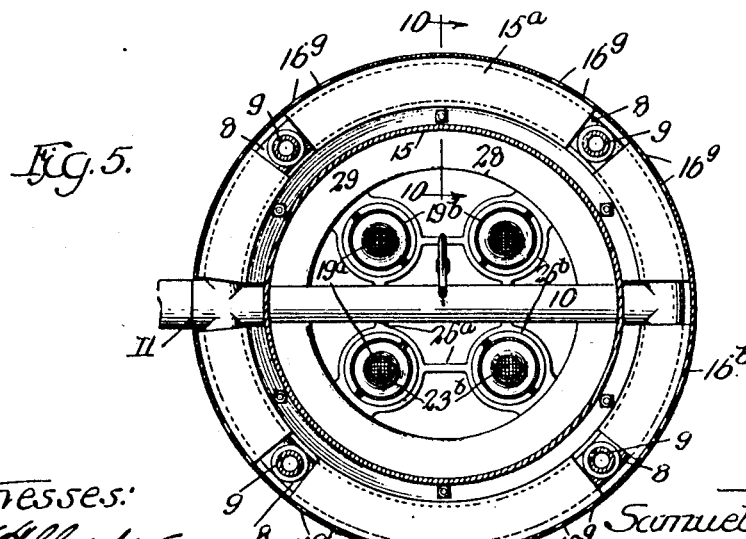
Figure 3:
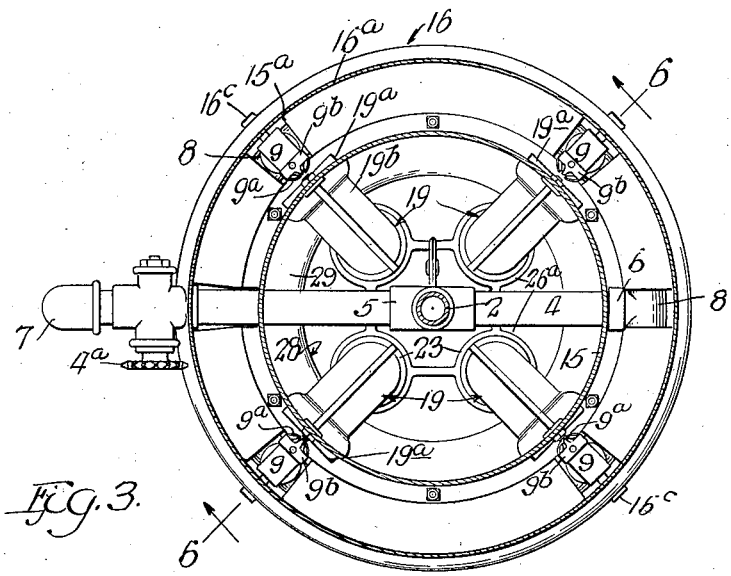
Figure 4:
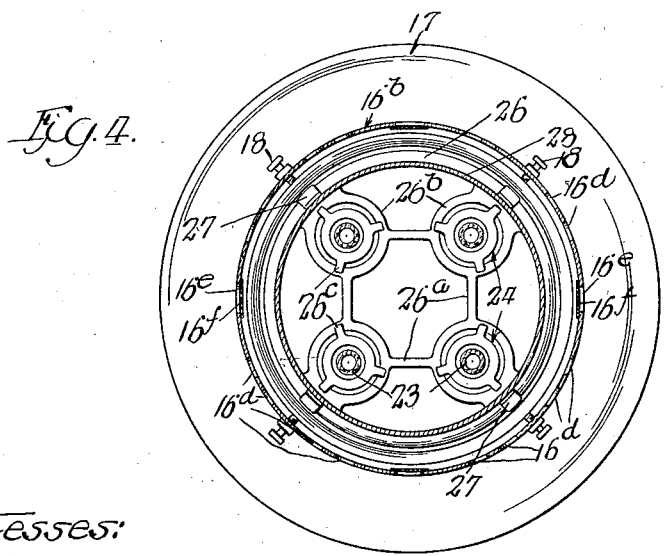

In the drawings:—Figure 1 is a side elevation of a gas lamp provided with my improvements. Fig. 2 is a vertical section through the lamp on an enlarged scale. Fig. 3 is a transverse section through Fig. 2 on the line 3—3 thereof. Fig. 4 is a similar section through Fig. 2 on the line 4—4 thereof. Fig. 5 is a similar section through Fig. 2 on the line 5—5 thereof. Fig. 6 is a vertical section through Fig. 3 on the line 6—6 thereof. Fig. 7 is an enlarged vertical section through one of the burner tubes and its supply nozzle. Fig. 8 is a front elevation on an enlarged scale of the nozzle which supplies gas to the burner tubes. Fig. 9 is a transverse section through Fig. 7 on the line 9—9 thereof. Fig. 10 is a partial vertical section through Fig. 5 on the line 10—10 thereof. Fig. 11 is a vertical section similar to Fig. 10 on a slightly diminished scale showing a modification of one feature of the invention.

In lamps of this character, as at present constructed, there is no change in the manner of the burning of the lamp or in the proper heating of the mantle, so long as the gas pressure remains the same as that at which the lamp was lighted or even when it is increased; but when said pressure is reduced or falls, as, for example, when another lamp or set of lamps supplied by the same system is lighted, the gas column supplying each burner is sucked back into the burner tube and then flashed back again with the result that there is deposited on the mantle a metallic substance which, in time, accumulates about the end of the mantle and as this substance will not incandesce, the efficiency of the mantle is destroyed.

One of the objects of my invention is to prevent this sucking back of the gas column into the burner tube when the gas pressure is decreased.

Another object of the invention is to provide the lamp with insulated burner tubes to prevent the mixture of gas and air from being disturbed or vitiated by excessive heat in its passage through the tubes.

Another object of my invention is to furnish a lamp provided with means for producing a more perfect mixture of gas and air thereby greatly enhancing the brilliancy and efficiency of the light.

These and various other advantages of my invetion will appear more clearly as I proceed with my specification.

In the drawings, 1 indicates the lamp as a whole which is supported on a centrally disposed gas supply pipe 2, and provided with a deflector 3 in the usual manner, (see Figs. 2 and 6). The supply pipe is connected to a horizontal, diametrically arranged cross-pipe 4 by means of a T-joint 5, said cross-pipe being capped at one end, as indicated at 6, and connected at its other end with a loop 7. Near said loop the pipe 4 is provided with a hand valve 4ª to control the supply of gas to the lamp. The loop 7 is connected in any suitable manner with a horizontally arranged pipe ring 8 to the upper side of which are secured several nozzles 9, one for each burner, by means of which jets of gas are directed into the burner tubes.

10 indicates a pipe diametrically arranged with reference to the pipe ring 8, and connected therewith to permit the ready and equal distribution of the gas throughout the gas ring without the necessity of the gas traversing the entire length of the ring to reach the nozzles on the side of the ring opposite the loop 7. Said pipe 10 and the gas ring 8 are preferably cast integral with each other, the pipe 10 being projected beyond the ring and there provided with a screw-thread for the attachment of the loop 7, as indicated at 11.

12 indicates a casing which is arranged concentrically about the pipe 2 and comprises a cylindric flanged top 13, a conical shell 14, and a cylindric shell 15 forming its base, the three being secured together in any suitable manner. The base 15 is provided at its bottom with an outwardly extending flange 15ª having an annular groove which rests upon the pipe ring 8 and thus supports the casing.

16 indicates an outer drum or casing which surrounds the base 15 and forms the outer wall of a chamber within which the pipe ring 8 is inclosed. Said casing is preferably made in two sections, upper and lower sections 16ª, 16ᵇ, secured together in any convenient manner. The upper section 16ª is secured between the upper edges of the base 15 and the lower edges of the conical shell 14. The lower section 16ᵇ is secured to the upstanding nozzles 9 by means of screws 16ᶜ and is provided at its lower end with an inwardly and downwardly turned flange adapted to embrace the upper flanged edge of the transparent globe 17 of the lamp, the same being secured in place therewithin by means of the usual set screws 18.

16ᵍ indicates openings located at each side of the nozzle to permit the entrance of air to be mixed with gases jetting therefrom, (see Fig. 1).

19 indicates the burner tubes, there being four in number in the lamp illustrated, which tubes open at their upper ends through holes cut in the base 15 of the casing 12 and which are supported thereupon in any convenient or usual manner. Said burner tubes comprise inner and outer tubes 19ª, 19ᵇ which are separated by an annular chamber. The inner tube is flared out at both ends, as indicated, respectively, at 21, 22, and said ends are connected to the tubes 19ᵇ in such a way as to make an air-tight chamber between the two tubes. This chamber may be filled either with dead air or may contain a vacuum and is intended to insulate the inner tube 19ª from the heat generated by the lamp, and to thus prevent the mixture of air and gas passing through the tubes from being disturbed by overheating.

23 indicates the burner which is made of non-heat conducting material and is secured to the lower end of the outer tube 19ᵇ. A cone 23ª made of non-heat conducting material rests within the burner 23 and serves to close the lower end of the insulating chamber surrounding the inner tube 19ª. A wire gauze 23ᵇ is located below the cone 23ª and rests on an asbestos ring 23ᶜ supported against the inner walls of the burner. Said wire gauze prevents the flame from flashing back into the burner tube.

Depending mantles are located below the burner tubes, as indicated at 24, and these are surrounded by a cylindric band 25, of transparent or translucent material, such, for example, as mica, which projects downwardly to a point on a level with, or below, the bottoms of said mantles. Said cylindric band is secured to a ring 26 which is supported by means of flat cast springs 27 at the lower end of a cylindric shell 28 that surrounds the lower ends of the burner tubes 19. The upper end of said shell is provided with an outwardly projecting flange 29 having an annular groove 30 which engages the lower face of the pipe ring 8. Said flange 29 is secured to the lower flange of the base of the stack 15 by means of nuts and bolts or in any other convenient manner. In the preferred construction embodying my invention, the supporting ring 26 is provided at its base with a transverse web 26ª (see Fig. 4) provided with smaller rings 26ᵇ which are adapted to engage and support projecting fingers or prongs 26ᶜ formed at the base of the mantle. Said ring thus combines two functions in that it supports the annular band 25 and also the mantles 24. Said ring, however, may be used for the support of the band 25 only as indicated in Fig. 11 where 26ᵈ represents the ring and 26ᵉ the band. In such case any other means may be used to support the mantles in position below the burners.

The discharge nozzles 9 are preferably provided with radially extending fingers 9ª which are formed integrally with a ring 9ᵇ adapted to be slipped over the end of the nozzle. Said fingers 9ª are arranged so as to extend into the gas column as it issues from the nozzle opening 9ᶜ, as indicated in Fig. 8. I find that the use of such fingers in connection with the use of a nozzle of this kind apparently breaks up the body of gas issuing from the mouth of the nozzle and causes it to follow a sort of scattered path on its way to the flared mouth of the burner tube 19 with the result that a better mixture of air is formed and drawn in with the gas and a bright incandescence of the mantle produced.

As the diameter of the nozzle orifice 9ᶜ should always be the same for gas of a certain richness, I prefer to provide the nozzles with tips 9ᵈ made of substantially non-heat expanding material such as lava or the like, so that the diameter of the orifice will not be affected by the heat of the lamp. Said tips may be secured to the main body of the nozzle in any convenient manner.

Arranged above the upper edges of the globe are a series of holes or openings 16ᵈ cut in the lower end of the section 16ᵇ of the outer casing 16. Said holes are all of the same size except the four separated by an angle 90° which are made larger, as indicated at 16ᵉ. Said openings are adapted to be closed by gravity controlled flap valves 16ᶠ (see Figs. 4, 6 and 10). The holes 16ᵈ are made sufficient in number and are of sufficient size to admit the entrance of plenty of air during the ordinary pressure at which the lamp burns. As the lamp heats up, however, a stronger draft is produced which, acting against the valves 16$^f$ causes them to open inwardly, thus permitting the entrance of a larger amount of air. If now for any reason the draft should be temporarily decreased there would be a tendency for the gas columns to be momentarily pushed back into the burner tubes if the amount of inrushing air from the openings above the globe continued the same. As, however, the force of the draft is decreased, the force of the air current attempting to pass through the larger openings 16$^e$, which force, before said decrease of the draft, acted to hold said valves 16$^f$ open, diminishes, so that said force is no longer sufficient to hold said valves away from their seats and said valves close on their seats and thus shut out the air which otherwise would enter freely through said openings 16$^e$. Under the force of the diminished draft, the amount of air entering the globe is thus diminished.

The operation of the band 25 is as follows: When the lamp is lighted a current of air is set up which passes from the openings 16$^d$, swirls down through the globe 17 and flows thence upwardly through the center of the lamp. This continues even when the gas pressure is increased and the lamp burns without smoking. When, however, the pressure is for any reason decreased, this current is disturbed and the inrushing air seeks the shortest possible path to pass up through the space between the burners and, if no band is used, the result is smoking mantles. With the band, however, the inrushing air is compelled to pass below the mantles before it can get to the stack to ascend and, as a result, the mantles do not smoke.

While I have shown and illustrated herein certain details of construction and arrangement it is to be understood that they may be modified in various ways without departing from the spirit of my invention and I do not wish to be limited by them except in so far as pointed out in the appended claims.

I claim as my invention:—

1. In a gas lamp, the combination with a centrally disposed stem or pipe, a cross-pipe secured to said stem, a horizontally arranged gas ring connected with said crosspipe, a hand-valve to control the supply of gas to said ring, a casing inclosing said stem and located within said gas ring, an outer casing surrounding and inclosing said gas ring, both of said casings being supported from said ring, nozzles located on said gas ring, depending burner tubes secured to and opening through said inner casing opposite said nozzles, a horizontally disposed frame supported below said burner tubes, and mantles supported by said frame in line with said burner tubes.

2. In a gas lamp, the combination with a centrally disposed stem or pipe, a cross-pipe secured to said stem, a horizontally arranged gas ring connected with said crosspipe, a hand-valve to control the supply of gas to said ring, an inner casing inclosing said stem and depending below said gas ring within said gas ring, an outer casing surrounding and inclosing said gas ring, both of said casings being supported on said gas ring, nozzles located on said gas ring, depending burner tubes secured to and opening through said casing opposite said nozzle, mantles supported below and in line with said burner tubes, and a globe surrounding said mantles, said globe being supported upon said outer casing.

3. In a gas lamp, the combination with a centrally disposed stem or pipe, a cross-pipe secured to said stem, a horizontally arranged gas ring connected with said crosspipe, a hand-valve adapted to control the supply of gas to said ring, and an inner casing inclosing said stem and depending below said ring and being located within said ring, an outer casing surrounding and inclosing said gas ring, both of said casings being supported from said ring, nozzles located on said gas ring, depending burner tubes secured to and opening through said casing opposite said nozzles, a horizontally disposed frame supported below said burner tubes from said inner casing, mantles supported by said frame in line with said burner tubes, a circular, depending, translucent band surrounding said mantle and supported upon said frame, and a globe surrounding said mantle and supported below said outer casing.

4. In a gas lamp, burner tubes, mantles depending below said burner tubes, a globe surrounding said mantles, air openings above said globe, movable valve members adapted to close a predetermined number of said air openings, said valve members being normally in closed position but being adapted to yield inwardly, a stack located above said mantles, and nozzles adapted to supply gas to said burner tubes, each of said nozzles being provided with a jet orifice and having fingers projecting in front of said jet orifice.

5. In a gas lamp, burner tubes, mantles depending below said burner tubes, a globe surrounding said mantles, a translucent band surrounding said mantles and extending down to the neighborhood of the lower ends of said mantles, air openings above said globe, movable valve members adapted to close a predetermined number of said air openings, said valve members being normally in closed position but being adapted to yield inwardly, a stack located above said mantles, and nozzles adapted to supply gas to said burner tubes, each of said nozzles being provided with a jet orifice and having fingers projecting in front of said jet orifice.

6. In a gas lamp, in combination with burner tubes, depending mantles located below said tubes, a transparent globe inclosing said mantles, air holes located above said globe adapted to permit the entrance of air into said globe, a plurality of auxiliary openings located above said globe, and movable valve members adapted to close a predetermined number of said openings, said valve members being normally in closed position but being adapted to yield inwardly.

7. In a gas lamp, the combination with burner tubes, depending mantles located below said tubes, a transparent globe inclosing said mantles, air holes located above said globe adapted to permit the entrance of air into said globe, a plurality of auxiliary openings located above said globe, and gravity controlled movable valve members adapted to close said auxiliary openings, said movable valve members being normally in closed position, but being adapted to yield inwardly.

8. A burner tube for gas lamps comprising inner and outer tubes of metal separated by an annular chamber closed at both ends, the closure at the point of burning comprising a burner tip of non-heat conducting material secured to the end of the outer tube, and a cone of non-heat conducting material resting at its base against the inner walls of said tip and at its opposite end inclosing and supporting said inner tube.

9. A burner tube for gas lamps comprising inner and outer tubes of metal separated by an annular chamber closed at both ends, the closure at the point of burning comprising a burner tip of non-heat conducting material secured to the end of the outer tube, a cone of non-heat conducting material resting at its base against the inner walls of said tip and at its opposite end inclosing and supporting said inner tube, a wire gauze below said cone, and an asbestos washer upon which said gauze rests.

In testimony, that I, claim the foregoing as my invention I affix my signature in the presence of two witnesses, this 20th day of August A. D. 1909.

SAMUEL B. HARVEY.

Witnesses:
 CLARENCE E. MEHLHOPE,
 GEORGE R. WILKINS.

---

Copies of this patent may be obtained for five cents each, by addressing the "Commissioner of Patents, Washington, D. C."